US010379366B1

(12) United States Patent
Bristol et al.

(10) Patent No.: US 10,379,366 B1
(45) Date of Patent: Aug. 13, 2019

(54) APPARATUS, SYSTEM, AND METHOD FOR ADJUSTING HEAD-MOUNTED-DISPLAY STRAPS

(71) Applicant: FACEBOOK TECHNOLOGIES, LLC, Menlo Park, CA (US)

(72) Inventors: Peter Wesley Bristol, Seattle, WA (US); Glen Jason Tompkins, Woodinville, WA (US); Lesley Ribble Magrath, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 14 days.

(21) Appl. No.: 15/582,566

(22) Filed: Apr. 28, 2017

(51) Int. Cl.
*G02B 27/14* (2006.01)
*G02B 27/01* (2006.01)

(52) U.S. Cl.
CPC .. *G02B 27/0176* (2013.01); *G02B 2027/0154* (2013.01); *G02B 2027/0169* (2013.01)

(58) Field of Classification Search
CPC .................................................. G02B 27/0176
USPC ......................................................... 359/630
See application file for complete search history.

(56) References Cited

U.S. PATENT DOCUMENTS

2002/0008677 A1* 1/2002 Saito .................. G02B 27/0176 345/8
2016/0299346 A1 10/2016 Allin et al.
2016/0363768 A1 12/2016 Drinkwater et al.
2016/0363772 A1* 12/2016 Miller .................. H05K 999/99
2016/0363996 A1 12/2016 Higgins et al.
2016/0366503 A1 12/2016 Miller et al.

OTHER PUBLICATIONS

Joseph Patrick Sullivan; Apparatus, System, and Method for Adjusting Head-Mounted-Display Straps, U.S. Appl. No. 15/615,775, filed Jun. 6, 2017.
Glen Jason Tompkins et al.; Apparatus System and Method for Adjusting Head-Mounted-Display Straps; U.S. Appl. No. 15/586,270, filed May 4, 2017.
Glen Jason Tompkins et al.; Apparatus, System, and Method for Adjusting Head-Mounted-Display Straps; U.S. Appl. No. 15/600,348, filed May 19, 2017.

* cited by examiner

Primary Examiner — James C. Jones
(74) Attorney, Agent, or Firm — FisherBroyles, LLP

(57) ABSTRACT

A head-mounted-display adjustment apparatus may include a spring assembly that includes a spring with a restoring force. The adjustment apparatus may also include a strap with a distal section coupled to a head-mounted display and a proximal section coupled to the spring assembly such that (i) the strap is extendable, via deflection of the spring, away from the head-mounted display, and (ii) when a user is wearing the head-mounted display, the restoring force of the spring holds, via the strap, the head-mounted display against the user's face. The adjustment apparatus may additionally include a projection assembly that couples the spring assembly to the head-mounted display and via which the spring assembly is extendable away from the head-mounted display. The adjustment apparatus may further include a mount that couples the projection assembly to the head-mounted display. Various other apparatuses, systems, and methods are also disclosed.

18 Claims, 15 Drawing Sheets

APPARATUS, SYSTEM, AND METHOD FOR ADJUSTING HEAD-MOUNTED-DISPLAY STRAPS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

In any use of a virtual reality headset, making the experience as immersive as possible may be critical. Regrettably, a variety of factors may disrupt virtual-reality immersion, and one of the most significant disruptions to having an immersive experience may be an ill-fitting headset. Since many headsets may be relatively heavy with most of their weight distributed toward the front, a poor fit may result in significant pressure on a user's face, leading to discomfort that may make a virtual reality experience less compelling.

Traditional virtual reality headsets may provide some limited options for addressing a poor fit, but these options may be sub-optimal. For example, adjusting a traditional headset for comfortable facial pressure and proper size may involve making numerous manual changes over several fitting attempts. This process may be surprisingly time-consuming, and for some users, finding a good fit may be quite difficult. The problem of achieving a good fit may be exacerbated for headsets that are used by multiple people, which may necessitate a refitting before each use. And finding a good fit isn't the only problem with using virtual reality headsets—the configuration of some traditional headset straps may result in awkward, uncomfortable, or comical attempts at putting on or removing headsets.

SUMMARY

As will be described in greater detail below, the instant disclosure generally relates to head-mounted-display-strap apparatuses, systems, and methods. In some examples, a head-mounted-display adjustment apparatus may include a spring assembly that has a spring with a restoring force. The apparatus may also include a strap with a distal section coupled to a head-mounted display and a proximal section coupled to the spring assembly, such that (i) the strap is extendable, via deflection of the spring, away from the head-mounted display, and (ii) when a user is wearing the head-mounted display, the restoring force of the spring holds, via the strap, the head-mounted display against the user's face. The apparatus may further include a projection assembly that couples the spring assembly to the head-mounted display and via which the spring assembly is extendable away from the head-mounted display. In addition to the projection assembly, the apparatus may include a mount that couples the projection assembly to the head-mounted display.

In some examples, the spring assembly may include (i) a tube that houses the spring, (ii) a strap connector coupled to a distal end of the tube, (iii) a distal stopping surface within the tube between the strap connector and a distal end of the spring, and (iv) a proximal stopping surface within the tube at a proximal end of the spring. In these examples, the strap connector may couple the proximal section of the strap to the tube. Additionally or alternatively, the spring assembly may include a rod that is within the tube and that couples the distal stopping surface to a proximal end of the projection assembly and thereby anchors the distal stopping surface within the tube.

In some embodiments, extending the strap away from the head-mounted display may pull the distal stopping surface toward the proximal stopping surface and thereby compress the spring between the distal stopping surface and the proximal stopping surface.

Extending the spring assembly away from the head-mounted display may cause one or more effects. In some examples, extending the spring assembly away from the head-mounted display via the projection assembly may decompress the spring. Additionally or alternatively, extending the spring assembly away from the head-mounted display via the projection assembly may extend the strap away from the head-mounted display.

In some examples, the projection assembly may include a sheath that holds the spring assembly, and the exterior of the sheath may include ridges defining an external thread. The projection assembly may also include a barrel with an internal thread adapted to fit the external thread of the sheath. In these examples, the barrel may be coupled to the mount such that rotating the barrel may cause linear movement of the sheath relative to the mount. In addition, the projection assembly may include a clevis with a pair of prongs through which the sheath runs, and the barrel may be situated between the pair of prongs. Thus, the barrel may be coupled to the mount via the clevis which inhibits linear movement of the barrel with respect to the mount. Furthermore, in some embodiments, the external thread of the sheath may be broken such that protrusions of the external thread occur along a longitudinal surface of the sheath. In these embodiments, the pair of prongs of the clevis may define a channel above the longitudinal surface of the sheath adapted to allow the protrusions of the external thread to pass under the clevis during linear movement of the sheath relative to the mount. In some examples, the surface of the barrel may be knurled.

According to various embodiments, a corresponding head-mounted-display system may include a head-mounted display. The system may also include a spring assembly including a spring with a restoring force. In addition, the system may include a strap with a distal section coupled to a head-mounted display and a proximal section coupled to the spring assembly, such that (i) the strap is extendable, via deflection of the spring, away from the head-mounted display, and (ii) when a user is wearing the head-mounted display, the restoring force of the spring holds, via the strap, the head-mounted display against the user's face. The system may additionally include a projection assembly that couples the spring assembly to the head-mounted display and via which the spring assembly is extendable away from the head-mounted display. Furthermore, the system may include a mount that couples the projection assembly to the head-mounted display.

The system may include more than one strap-adjustment apparatus, as shown in various embodiments herein. For example, the distal section of the strap may be coupled to the head-mounted display via an additional mount that couples an additional spring assembly to the head-mounted display. For example, the mount that couples the spring to the head-mounted display may be connected to a first section of the head-mounted display and may be dimensioned to be positioned at a left side of a user's head. Similarly, the additional mount that couples the additional spring to the head-mounted display may be connected to a second section of the head-mounted display that is dimensioned to be positioned at a right side of the user's head. In some examples, the strap may also include a medial section coupled to a third section of the head-mounted display, and the medial section may be dimensioned to be positioned at a user's forehead.

In addition to the various systems and devices described herein, the instant disclosure presents, by way of example, methods associated with head-mounted-display strap systems. For example, a method may include securing, to a head-mounted display, a projection assembly. The method may also include coupling a spring assembly including a spring with a restoring force to the head-mounted display via the projection assembly, where the spring assembly is extendable away from the head-mounted display via the projection assembly. In addition, the method may include coupling a distal section of a strap to the head-mounted display and coupling a proximal section of the strap to the spring assembly, such that (i) the strap is extendable, via movement of the telescoping assembly, away from the head-mounted display and (ii) when a user is wearing the head-mounted display, the restoring force of the spring holds, via the strap, the head-mounted display against the user's face.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
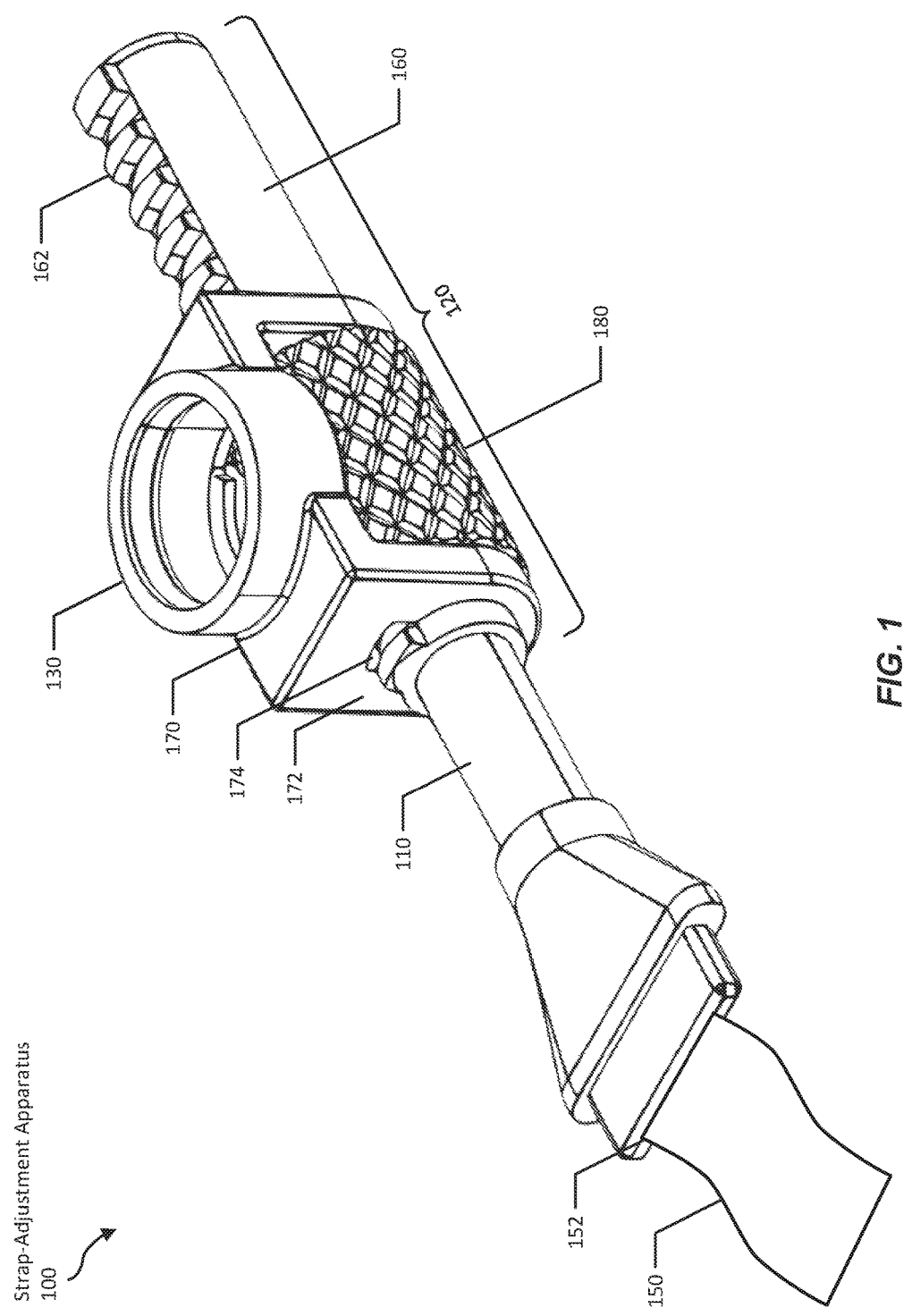
FIG. 1 is a perspective view of a strap-adjustment apparatus coupled to a strap of a head-mounted display.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates, by way of example, various telescoping mechanisms for adjusting head-mounted-display straps. These telescoping mechanisms may be extensibly connected to a head-mounted display and coupled to a strap that holds the head-mounted display against a user's head. The telescoping mechanisms disclosed herein may also provide various features and advantages over conventional strap systems. For example, the telescoping mechanisms disclosed herein may allow for quickly and intuitively putting on and removing a head-mounted display (e.g., simply by pulling on a strap to extend it and releasing the strap to allow the strap to retract via a spring). In addition, the telescoping mechanisms disclosed herein may allow for adjusting the fit of a head-mounted-display system with precision while requiring little dexterity (e.g., simply by rotating a barrel). Thus, the various devices and systems described herein may provide advantages of both convenience and comfort. As discussed in greater detail below, the various embodiments disclosed herein, whether used alone or in combination, may help optimize the immersiveness, enjoyability, and/or utility of a virtual- or augmented-reality experience.

The following will provide, with reference to FIGS. 1 and 3-9, examples of devices for adjusting head-mounted-display systems. In addition, the discussion associated with FIGS. 2 and 10-14 will provide examples of head-mounted-display systems that include the devices illustrated in FIGS. 1 and 3-9. Finally, the discussion corresponding to FIG. 15 will provide examples of methods for manufacturing, assembling, configuring, and/or using the head-mounted-display adjustment mechanisms presented herein.

FIG. 1 illustrates a strap-adjustment apparatus 100 for adjusting a head-mounted-display strap. Strap-adjustment apparatus 100 may include a spring assembly 110 coupled with a projection assembly 120. Together, spring assembly 110 and projection assembly 120 may form a telescoping assembly. The term "telescoping assembly," as used herein, generally refers to a coupling of elements (e.g., one element defining a channel into which another element is adapted to fit) in which the elements are movably attached to each other in a manner that enables the telescoping assembly to shorten and lengthen. For example, spring assembly 110 may extend away from projection assembly 120 and toward a strap 150 (thereby extending the strap away from the head-mounted display).

FIG. 1 further shows that projection assembly 120 includes a sheath 160, a clevis 170, and a barrel 180. As will be explained in greater detail below, by rotating barrel 180, sheath 160 may be extended away from the head-mounted display and toward strap 150. In some examples, this may have the effect of extending spring assembly 110 (and, therefore, strap 150) away from the head-mounted display. Additionally or alternatively, extending sheath 160 may have the effect of decompressing the spring in spring assembly 110, thereby reducing the force with which the head-mounted display is pulled against a user's face. The surface of sheath 160 may define external thread 162. Clevis 170 may include a pair of prongs (including, e.g., a prong 172). Barrel 180 may be situated between the pair of prongs of clevis 170. Clevis 170 may thereby inhibit linear movement of barrel 180 with respect to mount 130. The shape of the prongs may define a channel 174 through which external thread 162 may pass as sheath 160 travels relative to clevis 170.

As will be explained in greater detail below, spring assembly 110 may also extend strap 150 away from the head-mounted display independently of movement by components of projection assembly 120 (e.g., sheath 160). For example, a portion of spring assembly 110 may slide out of sheath 160, compressing a spring within spring assembly 110. In other words, strap 150 may be extendable, via deflection of the spring within spring assembly 110, away from the head-mounted display. Furthermore, when a user is wearing the head-mounted display, a restoring force of the spring may hold, via strap 150, the head-mounted display against the user's face.

The term "deflection," as used herein, generally refers to the movement or displacement of a spring, either by applying or removing force from it. The term "restoring force," as used herein, generally refers to any force that acts to restore a spring to equilibrium or rest. Thus, the restoring force of a spring could be said to act in opposition to any displacement of the spring.

FIG. 1 further shows a mount 130 that couples the projection assembly to the head-mounted display. In some examples, mount 130 may be coupled to clevis 170. In this manner, clevis 170 may remain in a fixed position relative to the head-mounted display. As will be explained in greater detail below, rotating barrel 180 may cause linear movement of sheath 160 relative to barrel 180. Because clevis 170 may restrain barrel 180, sheath 160 may therefore travel with respect to the head-mounted display when barrel 180 is rotated. In some examples, mount 130 may be formed or manufactured as an integral part of projection assembly 120 (e.g., as an integral part of clevis 170).

Figure 2:
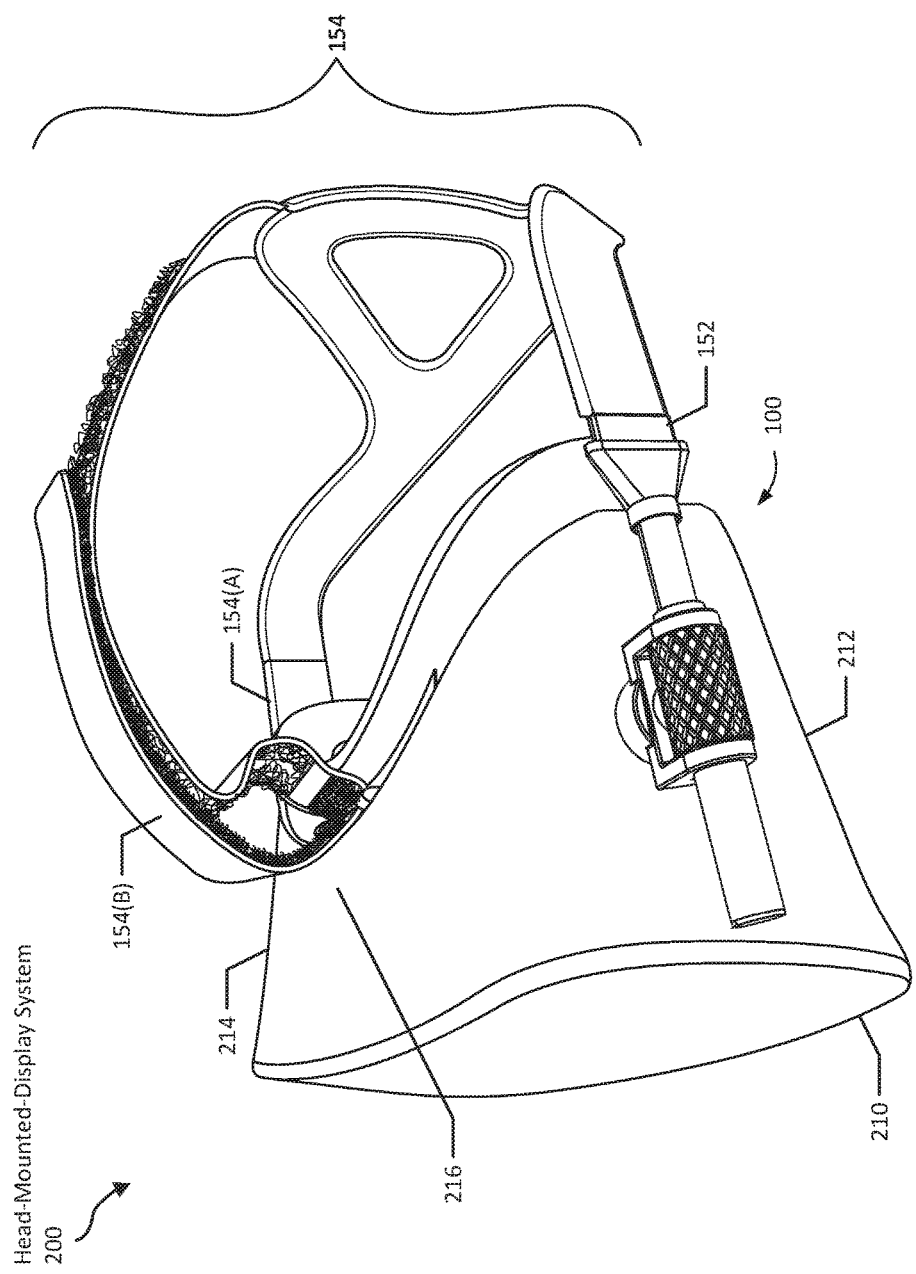
FIG. 2 is a perspective view of a system with a strap-adjustment apparatus coupled to a head-mounted display.

FIG. 2 is a perspective view of a head-mounted-display system 200 with strap-adjustment apparatus 100 coupled to a head-mounted display 210. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

As shown in FIGS. 1 and 2, a proximal section 152 of a strap 150 may be coupled to spring assembly 110. The term "strap," as used herein, generally refers any strip of material (plastic, leather, cloth, woven, etc.) used to fasten, secure, or otherwise couple one object (e.g., a head-mounted display) to another (e.g., a user's head). The straps discussed in the present disclosure may be of any suitable shape, size, flexibility, or elasticity (e.g., stretchable or non-stretchable).

Strap 150 may be coupled to spring assembly 110 either directly or indirectly. The example in FIG. 1 illustrates a direct coupling of strap 150 to spring assembly 110 with proximal section 152 of strap 150 attached to spring assembly 110. In some examples, strap 150 may be coupled to spring assembly 110 by being formed or manufactured as an integral part of spring assembly 110. Strap 150 may also be coupled to spring assembly 110 in any other suitable manner.

Proximal section 152 of strap 150 may be coupled to a side portion 212 (e.g., a left-hand side) of head-mounted display 210. Similarly, a distal section 154 of strap 150 may also be attached to head-mounted display 210, as shown in FIG. 2 and discussed in greater detail in the disclosure corresponding to FIGS. 10-14. Distal section 154 of strap 150 may include a side section 154(A) coupled to a side portion 214 (e.g., a right-hand side) of head-mounted display 210. Distal section 154 of strap 150 may also include a top section 154(B) coupled to a top portion 216 of head-mounted display 210.

When putting on head-mounted-display system 200 or taking off head-mounted-display system 200, strap-adjustment apparatus 100 may enable a user to make macro adjustments for fitting head-mounted display 210 to the user's head (e.g., via deflection of the spring in spring assembly 110). Macro adjustments may extend a strap within a range of approximately 1 millimeter (or less) to approximately 50 millimeters (or more) and may size head-mounted-display system 200 to accommodate heads of various shapes and sizes.

In addition to facilitating macro adjustments of head-mounted-display systems, embodiments of the instant disclosure may provide for micro adjustments of head-mounted-display systems. Micro adjustments may include fine tweaking to the pressure or fit of a head-mounted-display system. In some embodiments, micro-adjustments may be made while a user is wearing a head-mounted display, thus precluding the need to take off the head-mounted display when making fitting alterations. As will be explained in greater detail below, projection assembly 120 may provide for micro adjustments of head-mounted display systems.

Figure 3:
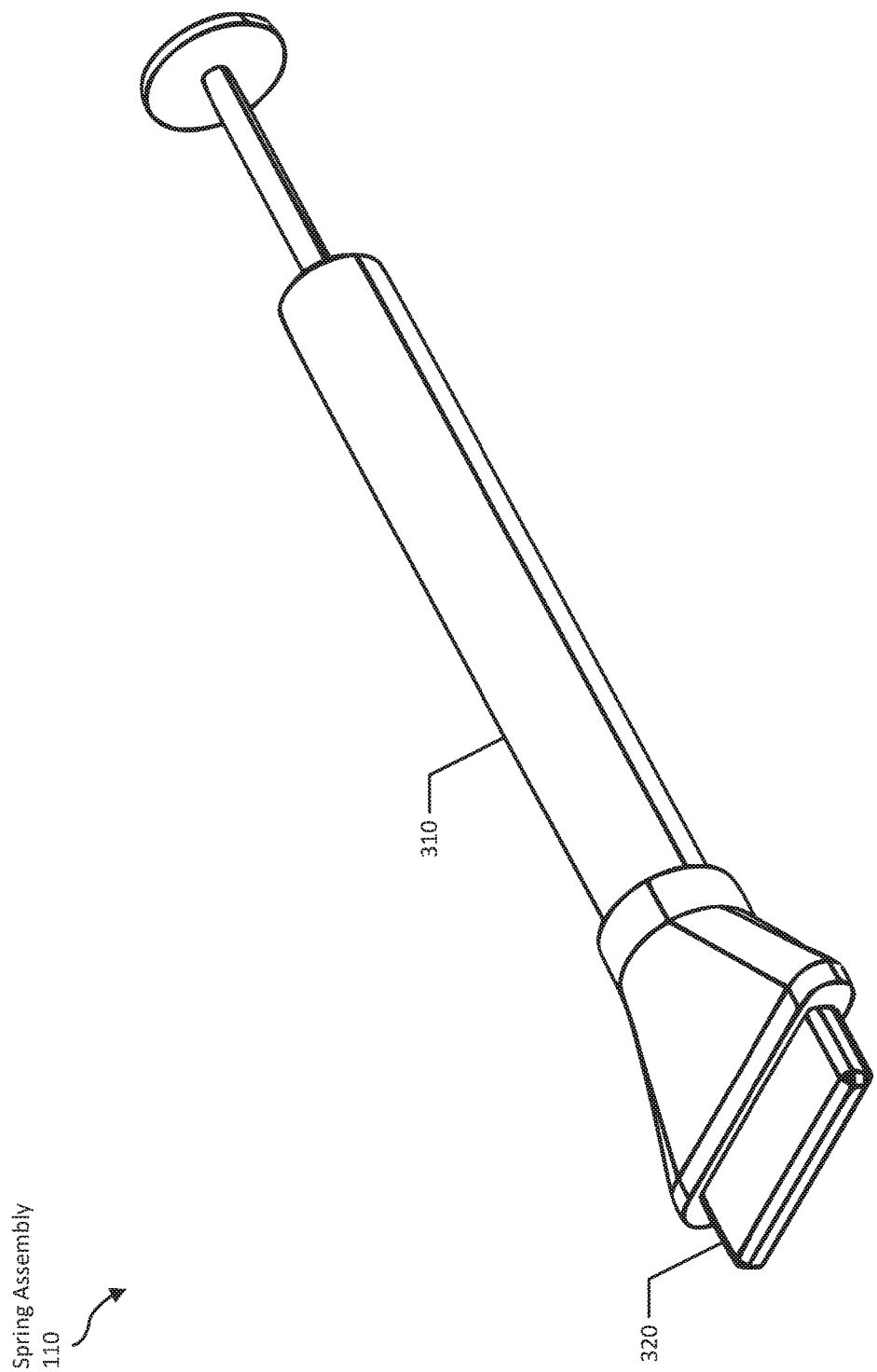
FIG. 3 is a perspective view of a spring assembly.
Figure 4:
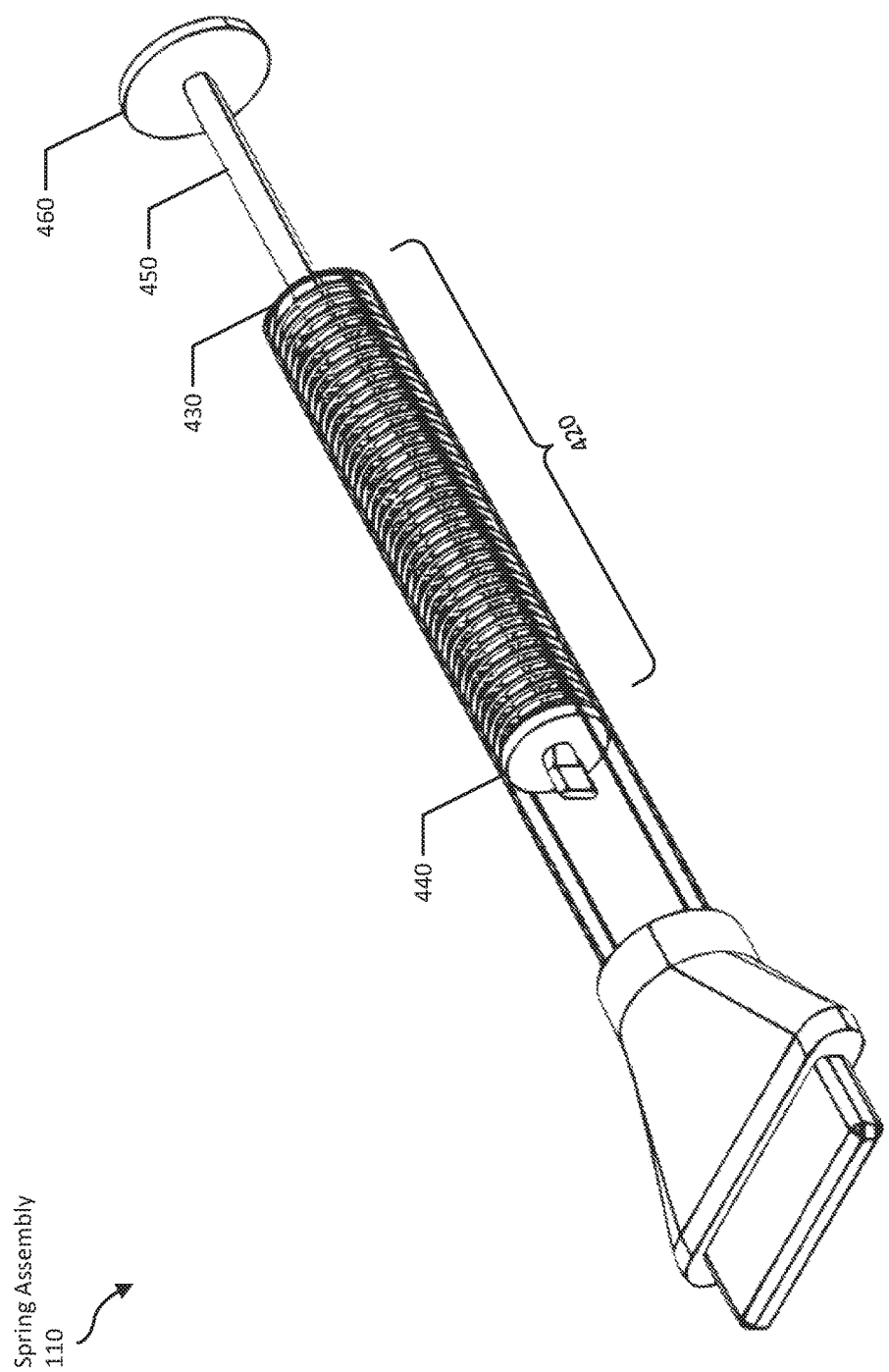
FIG. 4 is a perspective view of a spring assembly showing internal elements.

FIGS. 3 and 4 illustrate spring assembly 110. As shown in FIG. 3, spring assembly 110 may include a tube 310 and a strap connector 320. While tube 310 is shown as cylindrical in FIG. 3, tube 310 may be formed in any suitable shape to accommodate a spring on the inside and to slide within a sheath of a projection assembly, such as sheath 160. As shown in FIG. 4, inside tube 310 of spring assembly 110 may include a spring 420. A proximal stopping surface 430 within tube 310 (e.g., at an end of tube 310 opposite strap connector 320) may constrain spring 420 at a proximal end of tube 310. Likewise, a distal stopping surface within tube 310 between strap connector 320 and a distal end of spring 420 may constrain spring 420 at distal end of tube 310. Accordingly, as proximal stopping surface 430 and distal stopping surface 440 come together, spring 420 may compress, and as proximal stopping surface 430 and distal stopping surface 440 separate, spring 420 may expand again until at a resting state. In some examples, when in a resting state, spring 420 may be in contact with (or nearly in contact with) proximal stopping surface 430 and distal stopping surface 440.

Spring 420 may apply any amount of force that comfortably and/or securely holds a head-mounted display against a user's face. In some embodiments, spring 420 may, alone or in combination with one or more additional springs coupled to a strap 150, cause a head-mounted display to be pulled against a user's face with approximately 4-6 newtons of force. Furthermore, as discussed in greater detail below, a user may adjust strap-adjustment apparatus 100 to cause a head-mounted display to apply more or less force than a default force applied under default circumstances (e.g., approximately 5 newtons) caused by spring 420.

Spring 420 may also be dimensioned in any manner that is suitable for use in the embodiments disclosed herein. For example, spring 420 may be dimensioned to enable various amounts of displacement or extension of strap 150. In some embodiments, spring 420 may enable up to approximately 50 millimeters of extension for strap 150. In such embodiments, spring 420 may be at least 50 millimeters long. In other embodiments, spring 420 may be shorter or longer than 50 millimeters and may enable strap 150 to extend less than 50 millimeters (e.g., 30, 35, 40, or 45 millimeters) or more than 50 millimeters (e.g., 60, 70, 80, or 90 millimeters). In some configurations, the longer spring 420 is, the more ability strap-adjustment apparatus 100 may have to apply appropriate force when accommodating different shapes and sizes of user's heads.

As shown in FIG. 4, spring assembly 110 may include a rod 450 with tube 310. Rod 450 may couple distal stopping surface 440 to a proximal end of projection assembly 120. For example, rod 450 may couple distal stopping surface 440 to a disk 460 that, in turn, may be coupled to a proximal end of sheath 160 and/or that may bear upon a proximal end of sheath 160 when pulled toward sheath 160. Accordingly, when strap 150 is pulled away from the head-mounted display, strap 150 may pull tube 310 (including proximal stopping surface 430 within tube 310) via strap connector 320, thereby pushing spring 420 away from the head-mounted display. Because distal stopping surface 440 is coupled to disk 460 by rod 450, distal stopping surface 440 may stay in place as spring 420 compresses. Thus, the restoring force of spring 420 may push against proximal stopping surface 430 of tube 310 and, via tube 310, pull strap 150 back in the direction of the head-mounted display. Because rod 450 couples proximal stopping surface 430 to a distal end of projection assembly 120, rod 450 may anchor proximal stopping surface 430 within tube 310.

Figure 5:
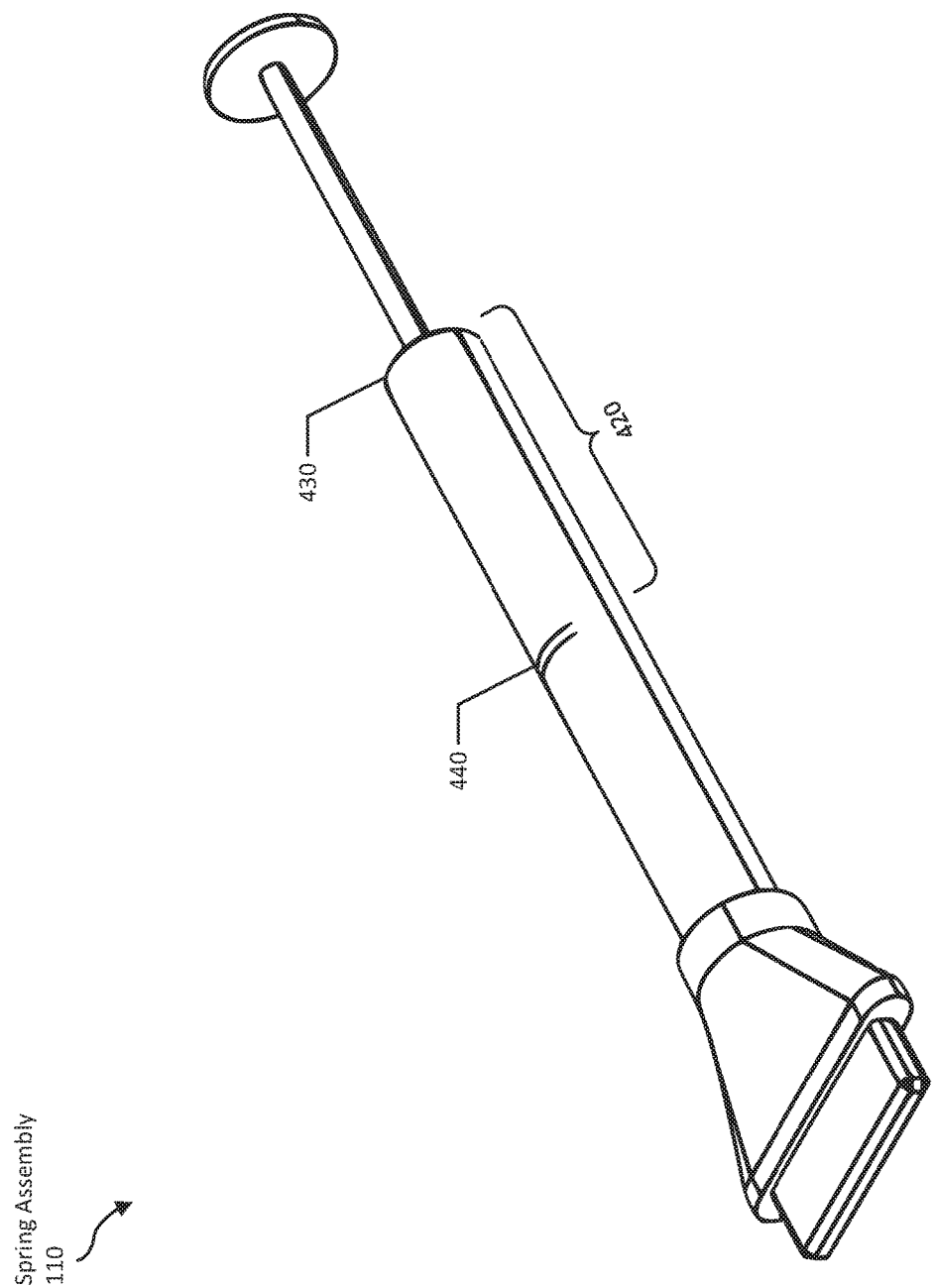
FIG. 5 is a perspective view of a spring assembly in an extended state.
Figure 6:
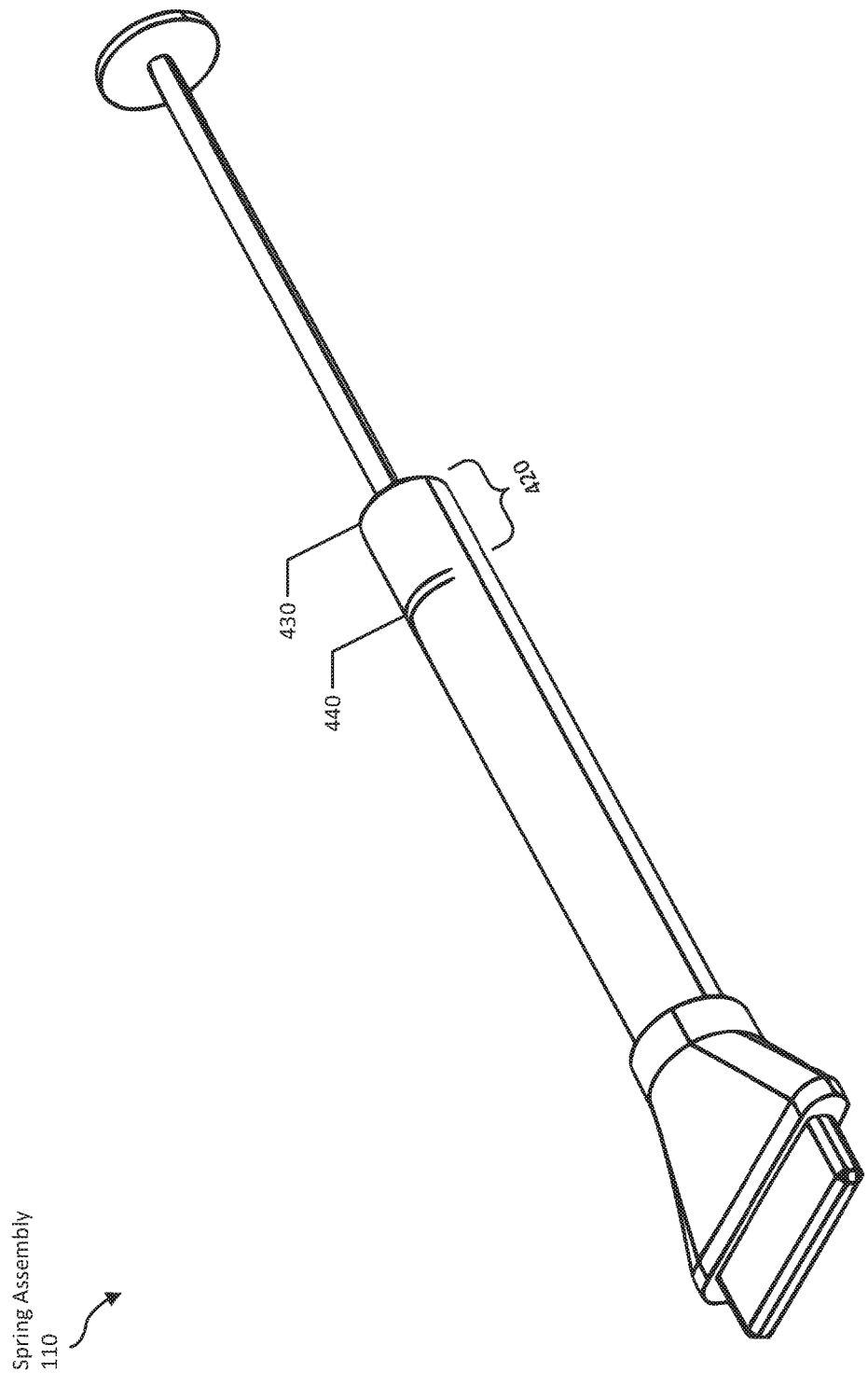
FIG. 6 is a perspective view of a spring assembly in a further extended state.

FIGS. 3, 5, and 6 show spring assembly 110 in different states. For example, FIG. 3 may show spring assembly 110 in a resting state (e.g., where spring 420 is not compressed). FIG. 5 shows spring assembly 110 in an extended state. As shown in FIG. 5, as tube 310 is pulled (e.g., by strap 150 via strap connector 320), proximal stopping surface 430 approaches distal stopping surface 440, compressing spring 420. FIG. 6 shows spring assembly 110 in a further extended state. As shown in FIG. 6, as tube 310 is pulled further, proximal stopping surface 430 draws closer to distal stopping surface 440, further compressing spring 420.

Figure 7:
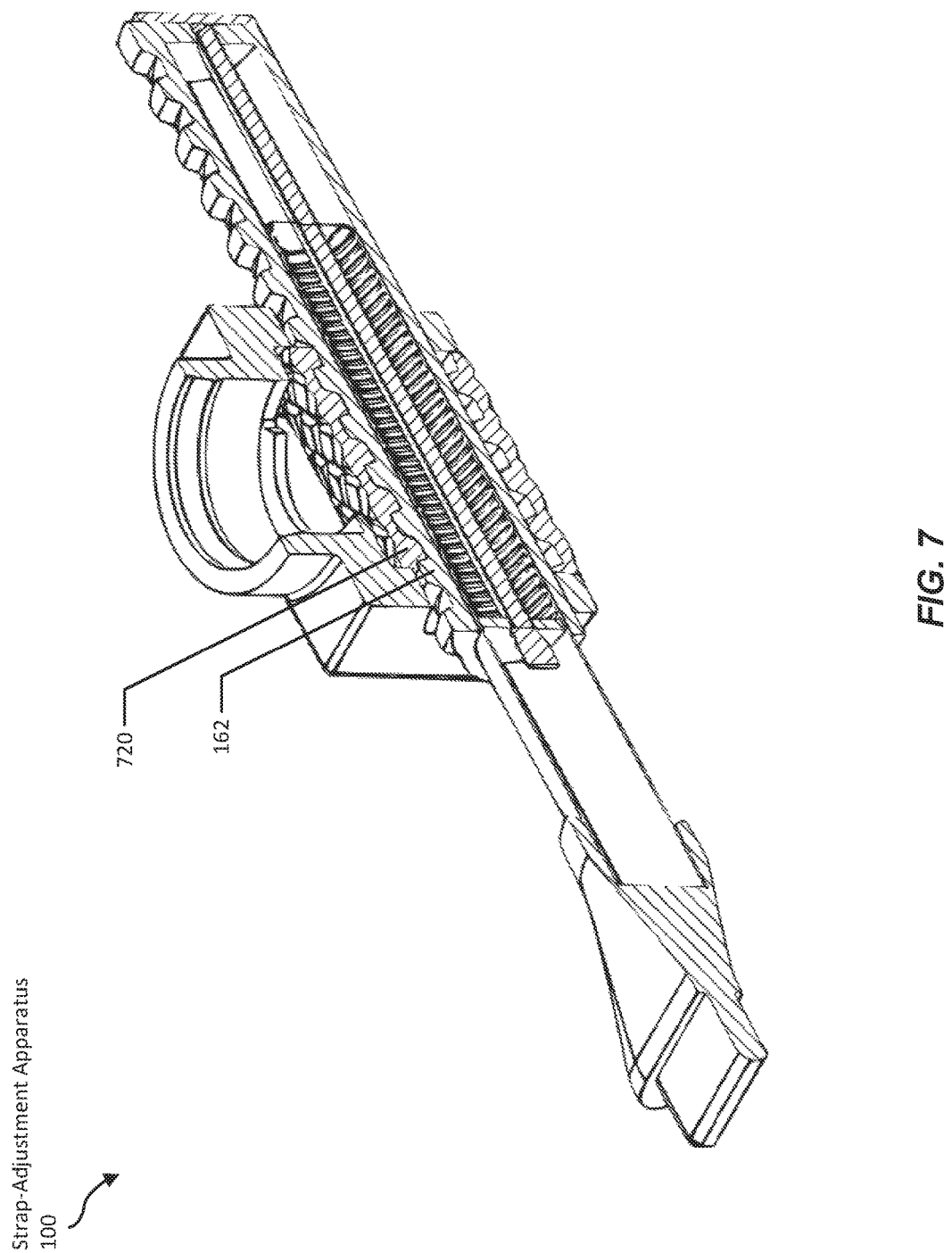
FIG. 7 is a cross-sectional view of a spring assembly.

FIG. 7 provides a cross-sectional view of strap-adjustment apparatus 100. As previously noted, the exterior surface of sheath 160 may have ridges defining an external thread 162. As shown in FIG. 7, in internal surface of barrel 180 may have an internal thread 720 adapted to fit external thread 162 of sheath 160. Accordingly, rotational motion of barrel 180 may be translated into linear motion of sheath 160.

Figure 8:
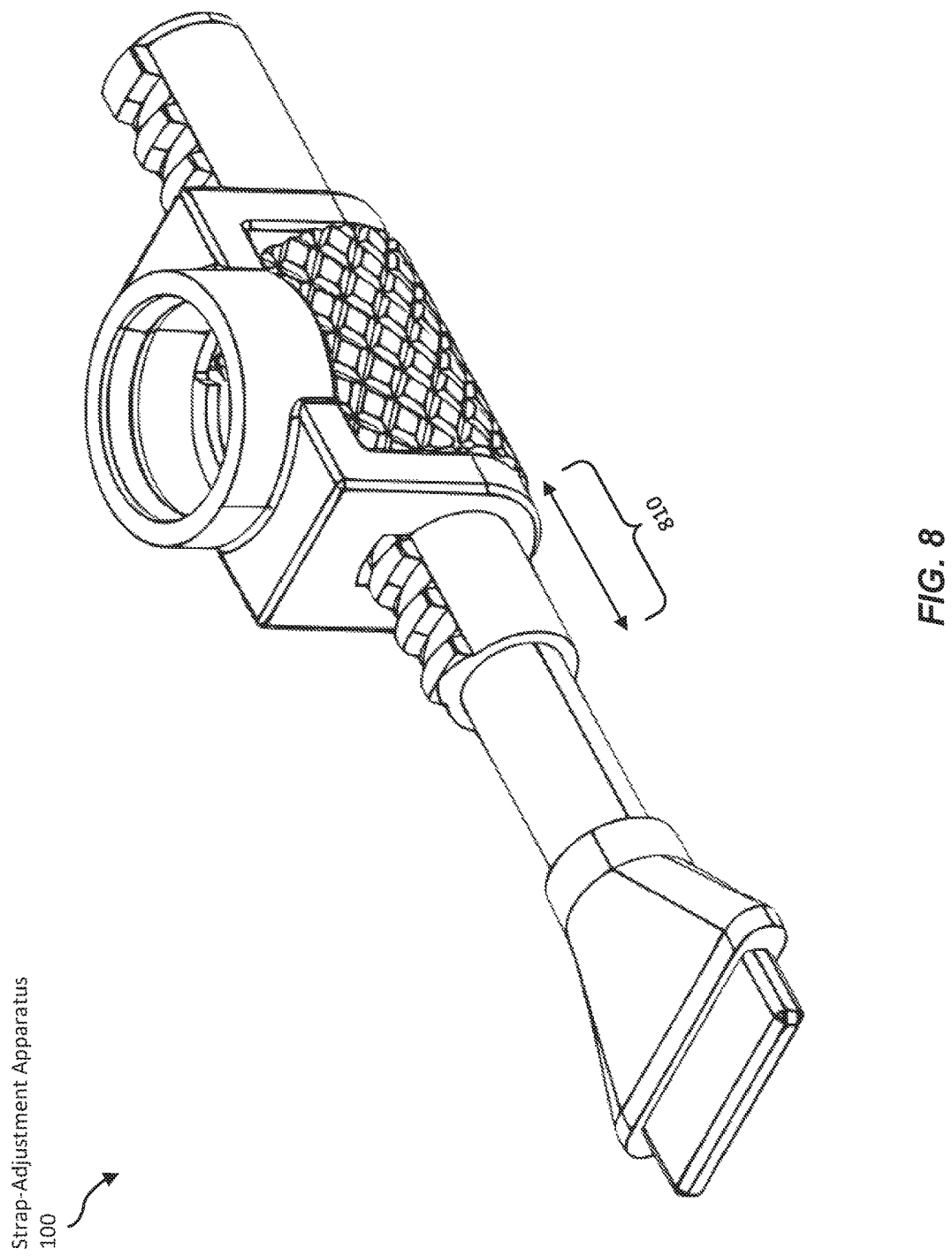
FIG. 8 is a perspective view of a strap-adjustment apparatus in an extended state.
Figure 9:
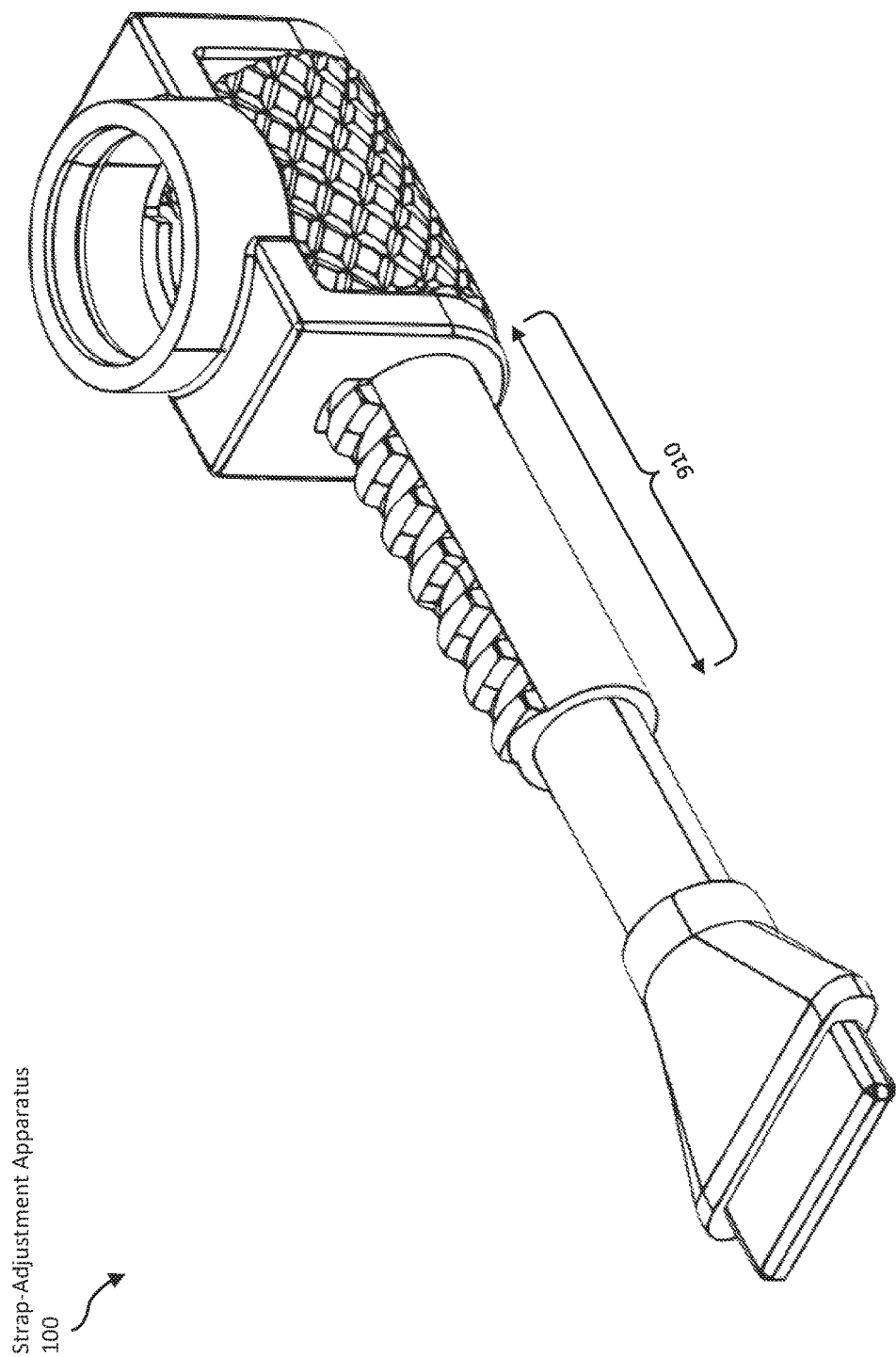
FIG. 9 is a perspective view of a strap-adjustment apparatus in a further extended state.

FIGS. 1, 8, and 9 show strap-adjustment apparatus 100 in different states. Specifically, FIGS. 1, 8, and 9 show sheath 160 and spring assembly 110 in different positions relative to clevis 170 and barrel 180. For example, FIG. 1 shows sheath 160 in a retracted position. FIG. 8 shows sheath 160 (and, with sheath 160, spring assembly 110) in an extended state. For example, sheath 160 may be extended by a distance 810. In some examples, distance 810 may represent a distance by which strap 150 is extended. Alternatively, distance 810 may represent a distance across which spring 420 has decompressed from a compressed state. In some examples, distance 810 may represent a sum of the distance by which strap 150 is extended and the distance across which spring 420 has decompressed. FIG. 9 shows sheath 160 in a further extended state. For example, sheath 160 may be extended by a distance 910. In some examples, distance 910 may represent a distance by which strap 150 is extended. Alternatively, distance 910 may represent a distance across which spring 420 has decompressed from a compressed state. In some examples, distance 910 may represent a sum of the distance by which strap 150 is extended and the distance across which spring 420 has decompressed. As shown in FIGS. 1, 8, and 9, the surface of barrel 180 may be knurled. In some examples, the knurled surface of barrel 180 may facilitate the rotation of barrel 180 by a user with minimal effort and/or dexterity. For example, a user may roll barrel 180 by pushing upward or downward on a face of barrel 180 with a finger or thumb. In general, the surface of barrel 180 may define any suitable texture for gripping and/or manipulating barrel 180.

Projection assembly 120 may be dimensioned in any manner that is suitable for use in the embodiments disclosed herein. For example, sheath 160 may be sufficiently long relative to barrel 180 to allow adjustments of projection assembly 120 to project spring assembly 110 up to the decompressed length of spring 420. In one example, projection assembly 120 may extend spring assembly 110 as far as 50 millimeters. In other embodiments, projection assembly 120 may be shorter and may enable spring assembly 110 to extend less than 50 millimeters (e.g., 10, 15, 20, or 25 millimeters).

As shown in FIGS. 1, 8, and 9, external thread 162 of sheath 160 may be broken, such that protrusions of the external thread occur along a longitudinal surface of the sheath 160 (e.g., along the top of sheath 160 as pictured in FIGS. 1, 8, and 9), but not, e.g., along the remaining surface of sheath 160. In these examples, the pair of prongs (including, e.g., prong 172) of clevis 170 may define a channel 174 above the longitudinal surface of sheath 160 that is dimensioned to allow the protrusions of external thread 162 to pass under clevis 170 during linear movement of sheath 160 relative to mount 130. In some examples, as will be discussed in greater detail below, a head-mounted-display system may include two instances of strap-adjustment apparatus 100 (a left-side instance and a right-side instance). In some examples, the two instances of strap-adjustment apparatus 100 may differ by the handedness of the internal threading of the barrel. For example, a barrel for the left-side instance may have a right-hand internal thread and a barrel for the right-side instance may have a left-hand internal thread. In this manner, control of the respective projection assemblies via the barrels may be more intuitive for a user. For example, if a clockwise rotation of both barrels translated into linear movement of the respective projection assemblies in the same direction, from the perspective of a user (who may have best access to the outsides of the barrels), achieving this uniform change would involve pushing upward on the outer side of one barrel and downward on the inner side of the other barrel. By using different handedness for the internal threads of the respective barrels, however, achieving a uniform change in the positions of the projection assemblies involves pushing in the same direction on the outer sides of the respective barrels. In some examples, external thread 162 may be cut to protrude only where both a left-hand external thread and a right-hand external thread would protrude, thereby allowing sheath 160 to be used for either a left-side strap-adjustment apparatus or a right-side strap-adjustment apparatus.

Figure 10:
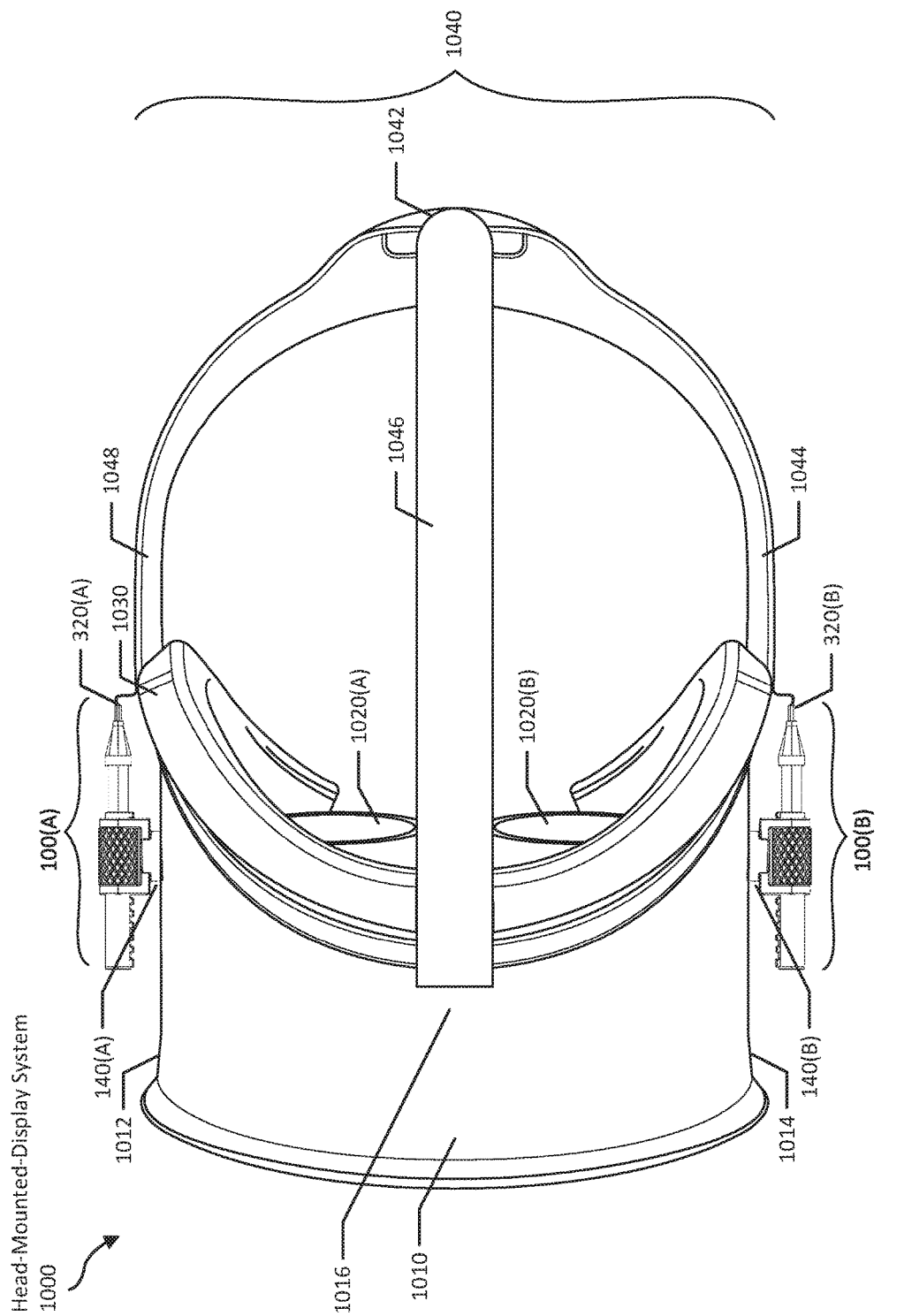
FIG. 10 is a top view of multiple strap-adjustment devices coupled to a head-mounted display.

The strap-adjustment devices shown in FIGS. 1 and 3-9 may be part of a head-mounted-display system, as shown in FIGS. 10-14. FIG. 10 is a top view of head-mounted-display system 1000 that includes two instances of strap-adjustment apparatus 100, which are referenced in FIG. 10 as 100(A) and 100(B). As shown in FIG. 10, strap-adjustment apparatus 100(A) may be mounted on a right side 1012 of a head-mounted display 1010 in a location that positions strap-adjustment apparatus 100(A) near a user's right temple when the user wears head-mounted-display 1010. Similarly, strap-adjustment apparatus 100(B) may be mounted on a left side 1014 of head-mounted display 1010 in a location that positions strap-adjustment apparatus 100(B) near a user's left temple when the user wears head-mounted display 1010.

Figure 11:
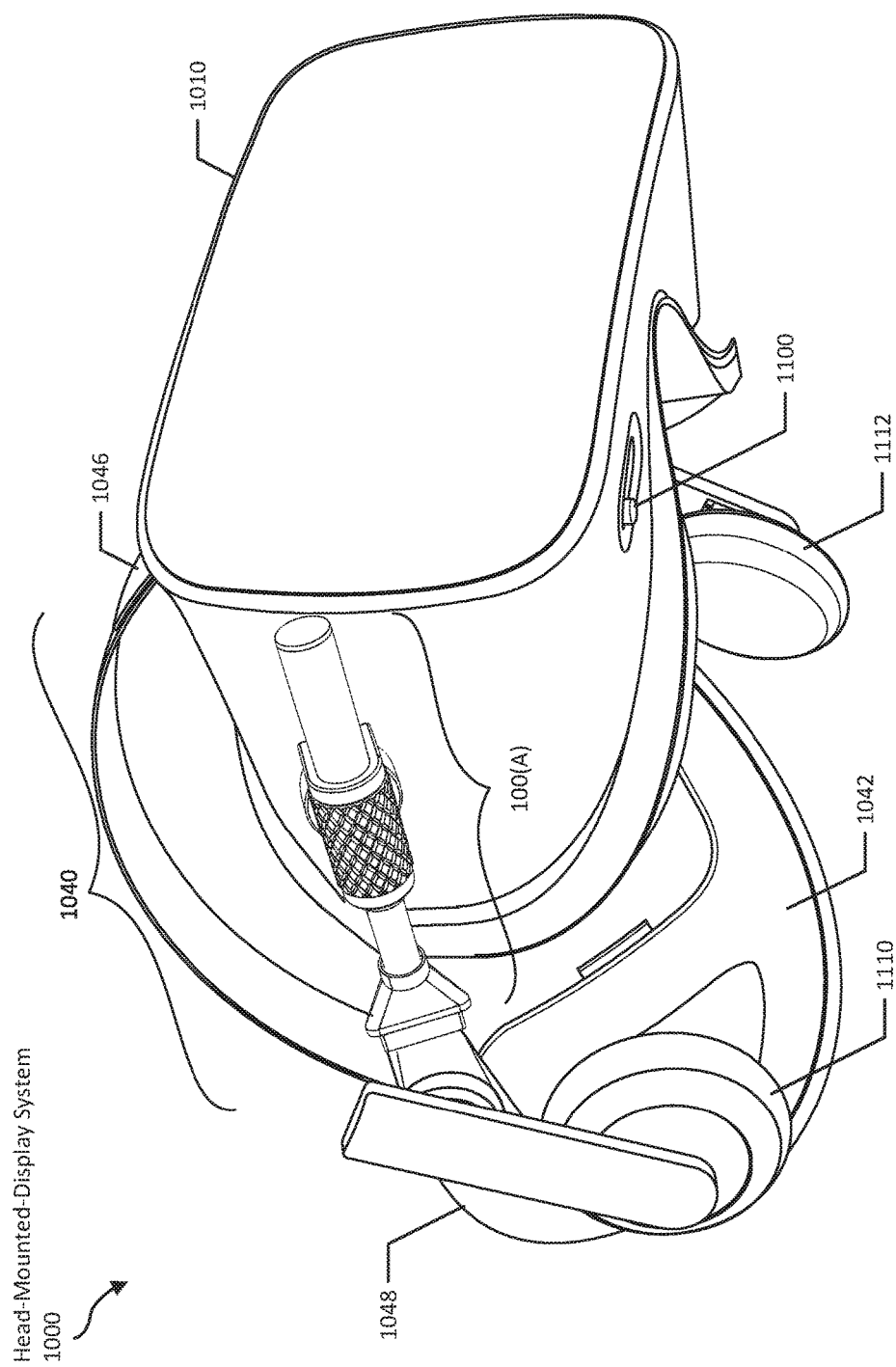
FIG. 11 is a perspective view of a head-mounted display with audio components that are coupled to strap-adjustment devices.

FIGS. 10 and 11 also show various additional elements that may be included in head-mounted-display system 1000. For example, head-mounted display 1010 may include display optics 1020(A-B) and a facial-interface system 1030 (e.g., a cushion). Head-mounted display 1010 may also be coupled to a strap system 1040, which may include a back section 1042 that forms a coupling point for a left side section 1044, a top section 1046, and a right-side section 1048. Left-side section 1044 of strap system 1040 may be coupled to strap-adjustment apparatus 100(B), right-side section 1048 may be coupled to strap-adjustment apparatus 100(A), and top section 1046 may be coupled to a top portion or area 1016 of head-mounted display 1010. Furthermore, as shown in FIG. 11. (a perspective view of head-mounted-display system 1000), head-mounted display 1010 may include a slider 1100 that may adjust a position and/or focus of optics 1020(A) and 1020(B). Also, as shown in FIG. 11, head-mounted-display system 1000 may include an audio system with headphones 1110 and 1112 that are coupled to strap-adjustment apparatus 100(A) and 100(B), respectively.

Figure 12:
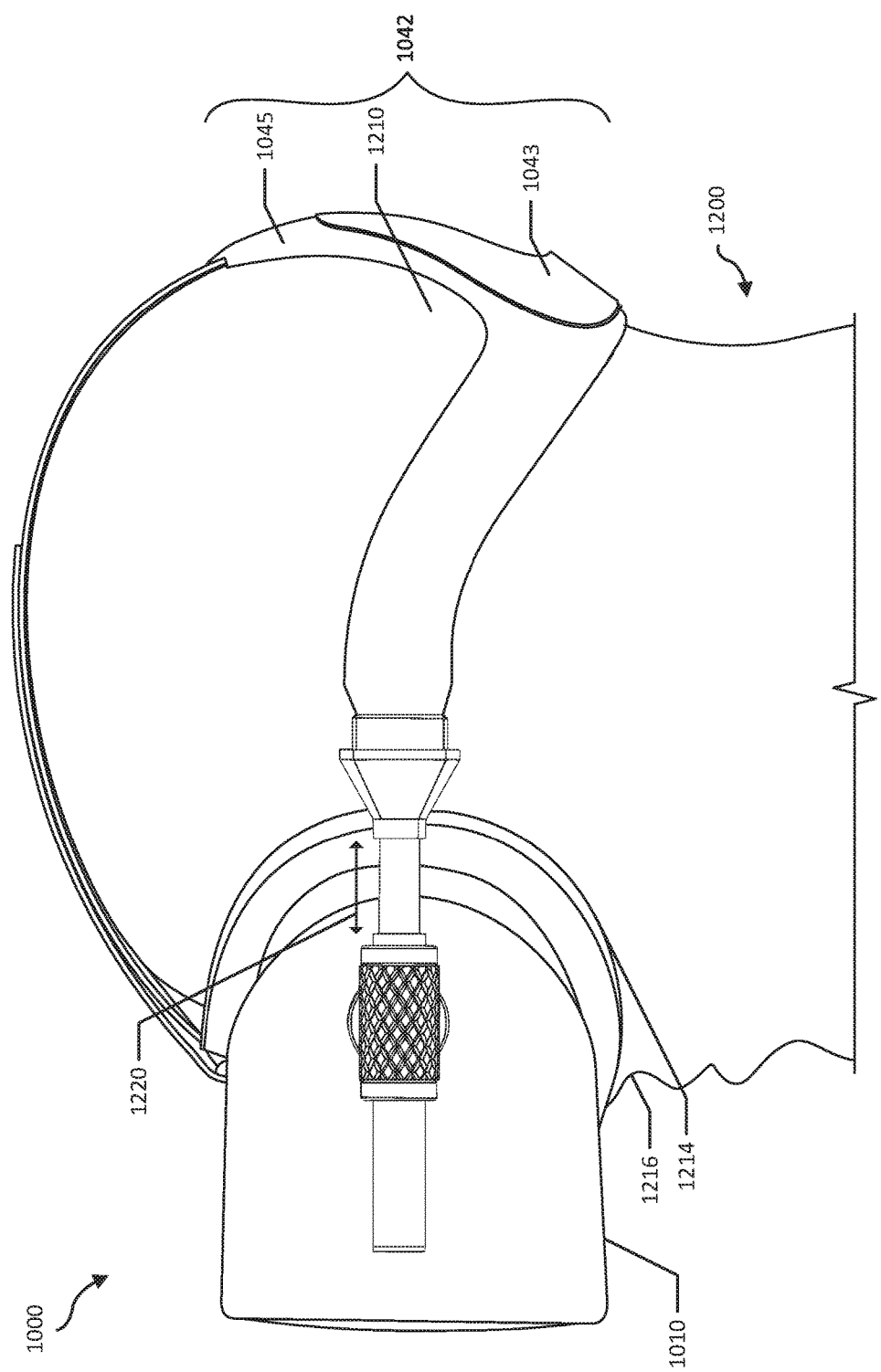
FIG. 12 is a side view of a head-mounted-display system positioned on a user's head.
Figure 13:
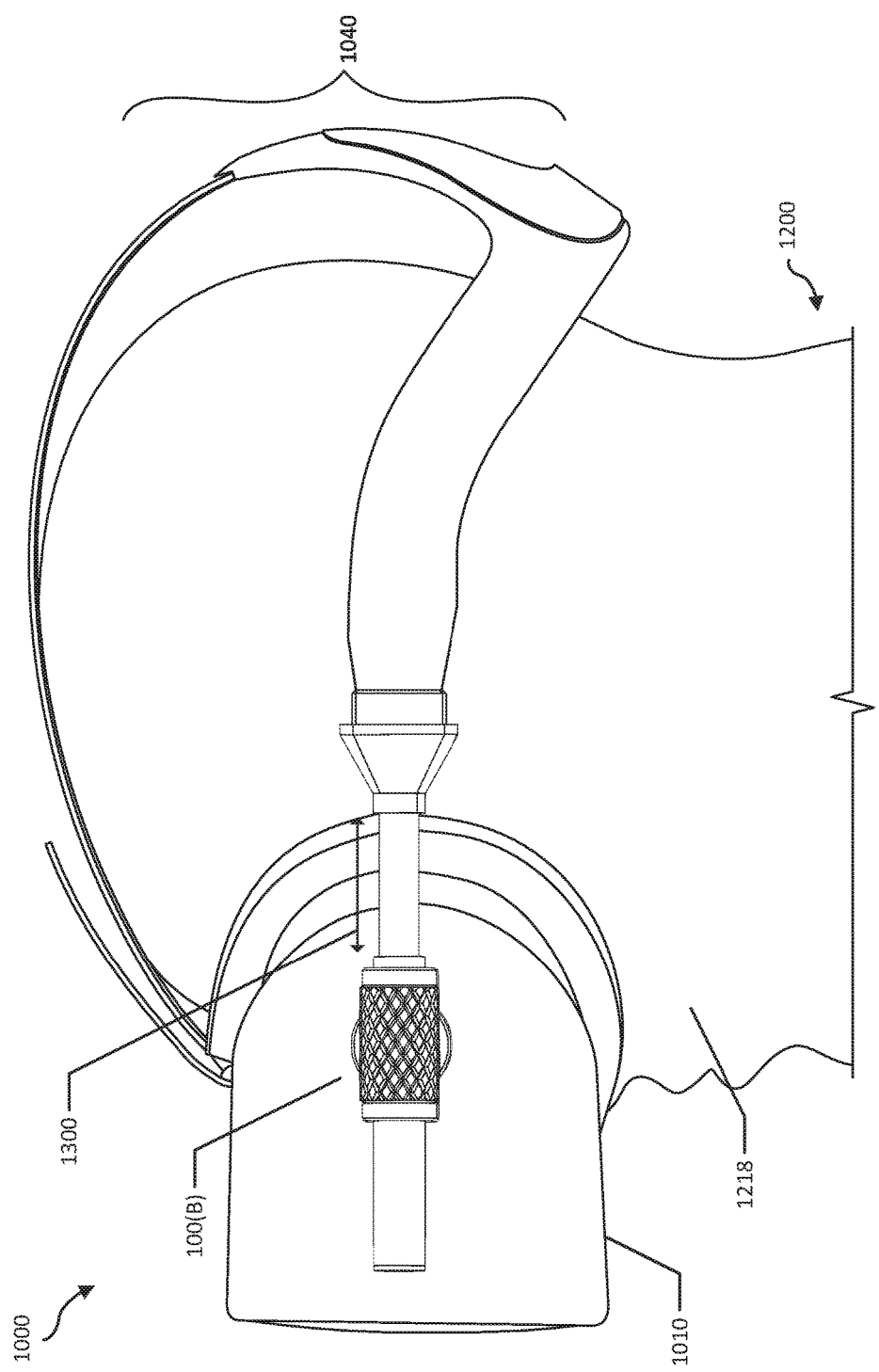
FIG. 13 is a side view of the head-mounted-display system of FIG. 12 with a strap system that is extended via strap-adjustment devices.
Figure 14:
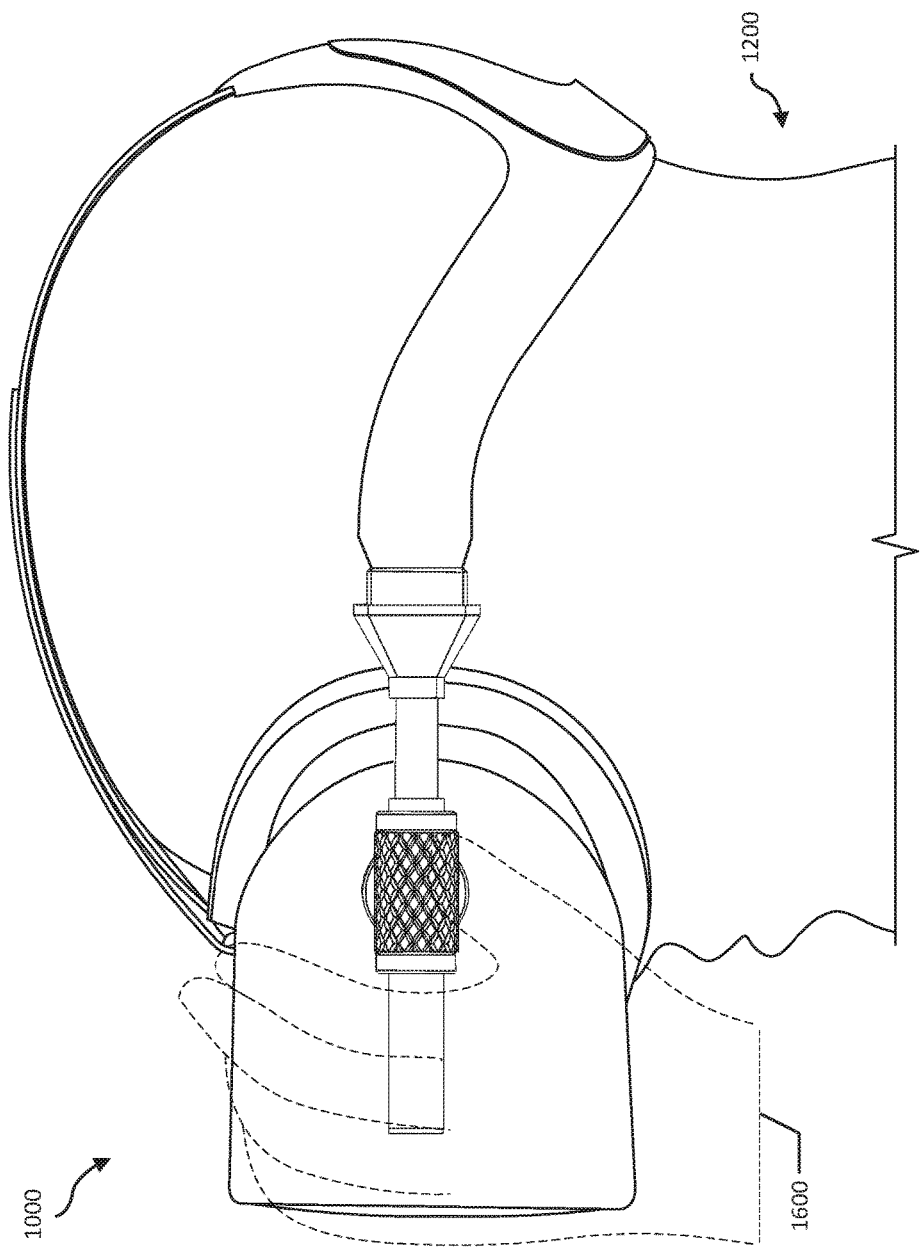
FIG. 14 illustrates a user making adjustments to the head-mounted-display system of FIG. 12.

FIGS. 12-14 show examples of how a user may wear and adjust head-mounted-display system 1000, A user may place head-mounted display 1010 on theft head 1200 and may manipulate strap-adjustment apparatus 100(B) to extend such that the spring assembly of strap-adjustment apparatus 100(B) protrudes beyond the projection assembly of strap-adjustment apparatus 100(B) by a distance. 1220, as shown in FIG. 12. While the user is wearing head-mounted-display system 1000, back section 1042 of strap system 1040 may include a lower region 1043 that conforms to a region of user's head 1200 below the user's occipital lobe 1210 (i.e., below the user's occipital protuberance). In some embodiments, back section 1042 of strap system 1040 may include an upper region 1045 that conforms to an upper-back region of user's head 1200 above occipital lobe 1210. Upper region 1045 of back section 1042 may coordinate with one or more other sections of strap system 1040 to balance and stabilize head-mounted display 1010 on user's head 1200. Additionally, strap system 1040 may allow minimum or no weight bearing on a user's cheek 1214 or nose 1216 when head-mounted display 1010 is on user's head 1200. Therefore, unlike the straps for ski goggles, which may rely on friction between the straps and the user's head and the friction between the goggles and the user's face to hold and balance the weight of the goggles, the flexible strap systems discussed in the present disclosure provide a much-improved user experience.

FIG. 13 shows strap system 1040 extended behind user's head 1200, thereby enabling convenient removal or securing of head-mounted-display system 1000 to user's head 1200. While FIG. 13 shows strap system 1040 being pulled back away from user's head 1200 with head-mounted display 1010 remaining against a user's face 1218, head-mounted display 1010 may additionally or alternatively be pulled away from user's face 1218 when the user is putting on or removing head-mounted display 1010. Further, by enabling strap system 1040 to move backward as the spring assembly of strap-adjustment apparatus 100(B) protrudes beyond the projection assembly of strap-adjustment apparatus 100(B) by distance 1300 (or further), strap-adjustment apparatus 100(B) may enable head-mounted-display system 1000 to be sized for various user's heads.

Turning to FIG. 14, a user wearing head-mounted-display system 1000 may make adjustments to the fit of head-mounted-display system 1000 while the user is wearing head-mounted-display system 1000. As shown, the thumb of user's hand 1400 may roll barrel 180 to extend or retract sheath 160. If the user rolls barrel 180 to retract sheath 160, spring 420 may become thereby compressed, increasing the force with which head-mounted display 1010 is pressed against the user's face 1218. If the user rolls barrel 180 in the opposite direction to extend sheath 160, spring 420 may become thereby decompressed, decreasing the force with which head-mounted display 1010 is pressed against the user's face 1218 (e.g., as spring assembly 110 retracts into sheath 160 due to the restoring force of spring 420). Additionally or alternatively (e.g., if spring 420 is already decompressed), if the user rolls barrel 180 to extend sheath 160, sheath 160 may extend without spring assembly 110 retracting (e.g., because spring 420 may no longer apply force to further retract spring assembly 110), and the strap may extend further from head-mounted display 1010.

Figure 15:
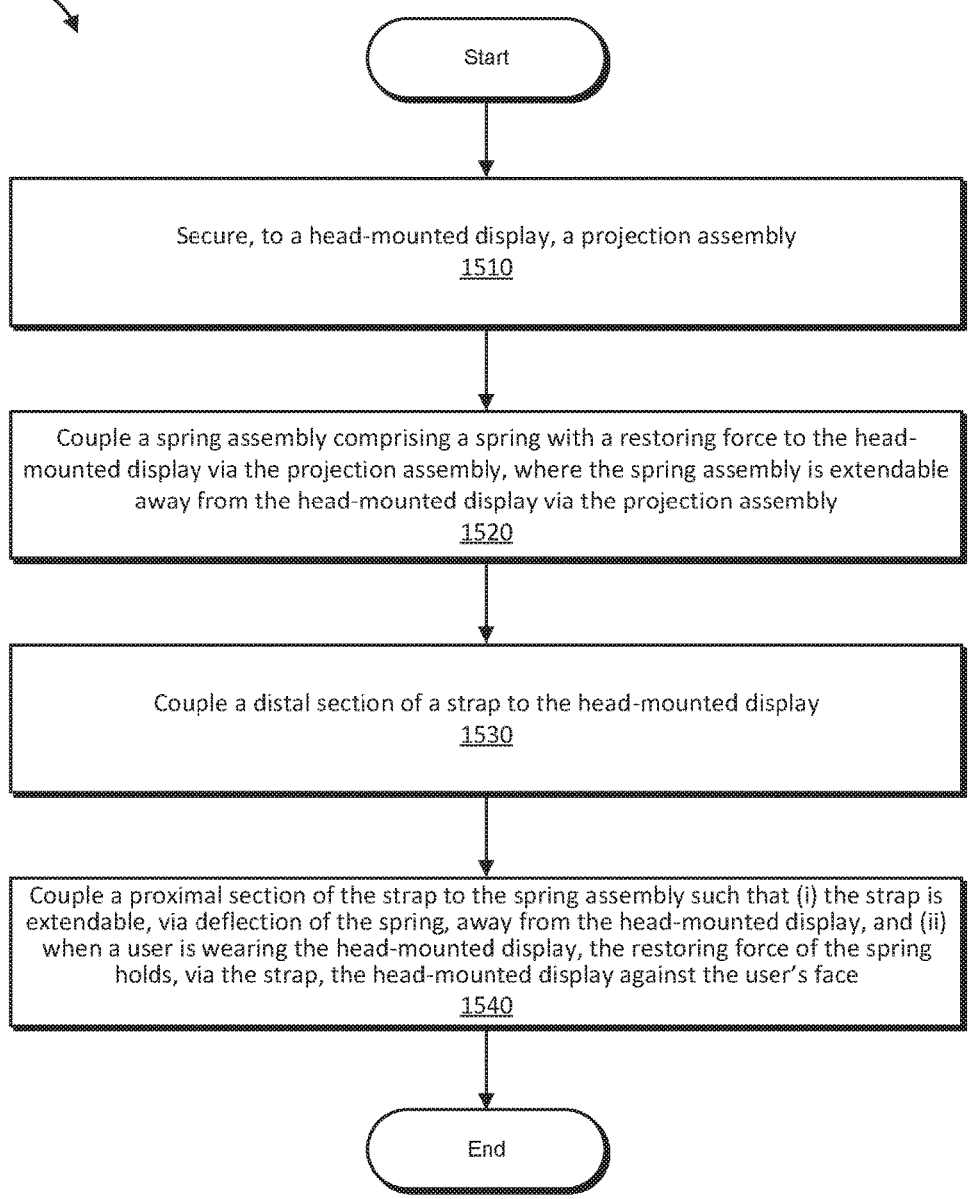
FIG. 15 is a flow diagram of a method for assembling a strap-adjustment apparatus.

FIG. 15 shows, by way of example, a method for manufacturing, assembling, using, adjusting, or otherwise configuring or creating the systems and devices presented herein. In particular, FIG. 15 illustrates a flow diagram of a method 1500 for securing a strap-adjustment apparatus to a head-mounted display. As shown in FIG. 15, at step 1510 a projection assembly may be secured to a head-mounted display. For example, projection assembly 120 may be secured to head-mounted display 210.

At step 1520, a spring assembly that includes a spring with a restoring force may be coupled to the head-mounted display via the projection assembly, where the spring assembly is extendable away from the head-mounted display via the projection assembly. For example, spring assembly 110 that includes spring 420 may be coupled to head-mounted display 210 via projection assembly 120 (spring assembly 110 may be extendable away from head-mounted display 210 via projection assembly 120).

At step 1530, a distal section of a strap may be coupled to the head-mounted display. For example, a distal section of strap system 1040 (e.g., left-side section 1044) may be coupled to head-mounted display 1010, either via a direct connection or an indirect connection (e.g., via strap-adjustment apparatus 100(B)). In such embodiments, the distal section of strap system 1040 may be attached to strap connector 320(B) of strap-adjustment apparatus 100(B).

At step 1540, a proximal section of the strap may be coupled to the spring assembly such that (i) the strap is extendable, via deflection of the spring, away from the head-mounted display and (ii) when a user is wearing the head-mounted display, a restoring force of the spring holds, via the strap, the head-mounted display against the user's face. For example, proximal section 152 of strap system 1040 may be connected to strap connector 320(A). In this configuration, proximal section 152 of strap system 1040 may extend toward a back of a user's head when spring assembly extends from sheath 160 and spring 420 is compressed.

The process parameters and sequence of the steps described and/or illustrated in FIG. 15 are given by way of example only and can be varied as desired. For example, while the steps illustrated and/or described herein may be shown or discussed in a particular order, these steps do not necessarily need to be performed in the order illustrated or discussed to assemble, manufacture, or use strap-adjustment apparatus 100. The various exemplary methods described and/or illustrated in FIG. 15 may also omit one or more of the steps described or illustrated herein or include additional steps in addition to those disclosed.

As discussed throughout the instant disclosure, the disclosed methods, systems, and devices may provide one or more advantages over traditional headset fitting mechanisms. As a result, these strap-adjustment devices may comfortably accommodate a wider range of head sizes than other systems. As another example, by using springs to enable strap extension, the systems described herein may eliminate some (or all) of the manual adjustments that may have been needed to initially fit a traditional head-mounted display. In addition, by using projection assemblies to extend the spring assemblies and thereby reduce the compression of the springs, the systems described herein may allow users to properly fit the head-mounted display with little time and effort. Thus, switching a headset between multiple users may be much less cumbersome and time-consuming. Furthermore, by enabling a user to make micro adjustments while using a head-mounted display, the systems described herein may allow the user to stay immersed in a virtual- or augmented-reality experience without discomfort or distraction. In general, the systems disclosed herein may improve immersion and/or enjoyment of using a head-mounted display, making virtual- and augmented-reality experiences more fulfilling or useful.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, thereby enabling others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various embodiments described herein is for the purpose of explaining particular embodiments only and is not intended to be limiting. As used in the discussion of the various highlighted embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A head-mounted-display adjustment apparatus comprising:
    a spring assembly comprising a compression spring with a restoring force;
    a strap comprising a distal section coupled to a head-mounted display and a proximal section coupled to the spring assembly such that:
        the strap is extendable, via deflection of the spring, away from the head-mounted display, and
        when a user is wearing the head-mounted display, the restoring force of the spring holds, via the strap, the head-mounted display against the user's face;
    a projection assembly that couples the spring assembly to the head-mounted display and via which the spring assembly is extendable away from the head-mounted display, wherein extending the spring assembly away from the head-mounted display via the projection assembly decompresses the spring; and
    a mount that couples the projection assembly to the head-mounted display.

2. The head-mounted-display adjustment apparatus of claim 1, wherein:
    the spring assembly comprises:
        a tube that houses the spring,
        a strap connector coupled to a distal end of the tube, a distal stopping surface within the tube between the strap connector and a distal end of the spring, and a proximal stopping surface within the tube at a proximal end of the spring; and the strap connector couples the proximal section of the strap to the tube.

3. The head-mounted-display adjustment apparatus of claim 2, wherein extending the strap away from the head-mounted display pulls the distal stopping surface toward the proximal stopping surface and thereby compresses the spring between the distal stopping surface and the proximal stopping surface.

4. The head-mounted-display adjustment apparatus of claim 2, wherein the spring assembly comprises a rod that is within the tube and that couples the distal stopping surface to a proximal end of the projection assembly and thereby anchors the distal stopping surface within the tube.

5. The head-mounted-display adjustment apparatus of claim 1, wherein extending the spring assembly away from the head-mounted display via the projection assembly extends the strap away from the head-mounted display.

6. The head-mounted-display adjustment apparatus of claim 1, wherein the projection assembly comprises:

a sheath that holds the spring assembly, the exterior surface of the sheath comprising ridges defining an external thread; and a barrel with an internal thread adapted to fit the external thread of the sheath.

7. The head-mounted-display adjustment apparatus of claim 6, wherein the barrel is coupled to the mount such that rotating the barrel causes linear movement of the sheath relative to the mount.

8. The head-mounted display adjustment apparatus of claim 7, wherein:

the projection assembly comprises a clevis with a pair of prongs through which the sheath runs, the barrel being situated between the pair of prongs; and the barrel is coupled to the mount via the clevis which inhibits linear movement of the barrel with respect to the mount.

9. The head-mounted-display adjustment apparatus of claim 8, wherein:

the external thread of the sheath is broken such that protrusions of the external thread occur along a longitudinal surface of the sheath; and the pair of prongs of the clevis define a channel above the longitudinal surface of the sheath adapted to allow the protrusions of the external thread to pass under the clevis during linear movement of the sheath relative to the mount.

10. The head-mounted-display adjustment apparatus of claim 6, wherein a surface of the barrel is knurled.

11. A head-mounted-display system comprising:

a head-mounted display;

a spring assembly comprising a compression spring with a restoring force;

a strap comprising a distal section coupled to the head-mounted display and a proximal section coupled to the spring assembly such that:

the strap is extendable, via deflection of the spring, away from the head-mounted display, and when a user is wearing the head-mounted display, the restoring force of the spring holds, via the strap, the head-mounted display against the user's face;

a projection assembly that couples the spring assembly to the head-mounted display and via which the spring assembly is extendable away from the head-mounted display, wherein extending the spring assembly away from the head-mounted display via the projection assembly decompresses the spring; and a mount that couples the projection assembly to the head-mounted display.

12. The head-mounted-display system of claim 11, wherein the distal section of the strap is coupled to the head-mounted display via an additional mount that couples an additional spring assembly and an additional projection assembly to the head-mounted display.

13. The head-mounted-display system of claim 12, wherein:

the mount is connected to a first section of the head-mounted display that is dimensioned to be positioned at a left side of the user's head; and the additional mount is connected to a second section of the head-mounted display that is dimensioned to be positioned at a right side of the user's head.

14. The head-mounted-display system of claim 13, wherein the strap comprises a medial section coupled to a third section of the head-mounted display that is dimensioned to be positioned at a forehead of the user.

15. The head-mounted-display system of claim 11, wherein:

the spring assembly comprises:

a tube that houses the spring, a strap connector coupled to a distal end of the tube, a distal stopping surface within the tube between the strap connector and a distal end of the spring, and a proximal stopping surface within the tube at a proximal end of the spring; and the strap connector couples the proximal section of the strap to the tube.

16. The head-mounted-display system of claim 15, wherein extending the strap away from the head-mounted display pulls the distal stopping surface toward the proximal stopping surface and thereby compresses the spring between the distal stopping surface and the proximal stopping surface.

17. The head-mounted-display system of claim 15, wherein the spring assembly comprises a rod that is within the tube and that couples the distal stopping surface to a proximal end of the projection assembly and thereby anchors the distal stopping surface within the tube.

18. A method comprising:

securing, to a head-mounted display, a projection assembly;

coupling a spring assembly comprising a compression spring with a restoring force to the head-mounted display via the projection assembly, wherein the spring assembly is extendable away from the head-mounted display via the projection assembly, and wherein extending the spring assembly away from the head-mounted display via the projection assembly decompresses the spring;

coupling a distal section of a strap to the head-mounted display; and coupling a proximal section of the strap to the spring assembly such that:

the strap is extendable, via deflection of the spring, away from the head-mounted display, and when a user is wearing the head-mounted display, the restoring force of the spring holds, via the strap, the head-mounted display against the user's face.

* * * * *

UNITED STATES PATENT AND TRADEMARK OFFICE
CERTIFICATE OF CORRECTION

PATENT NO. : 10,379,366 B1
APPLICATION NO. : 15/582566
DATED : August 13, 2019
INVENTOR(S) : Peter Wesley Bristol et al.

Page 1 of 2

It is certified that error appears in the above-identified patent and that said Letters Patent is hereby corrected as shown below:

On the Title Page

In Column 1, item (54), Title, Line 2, delete "HEAD-MOUNTED-DISPLAY" and insert -- HEAD-MOUNTED DISPLAY --, therefor.

In Column 2, item (56), other publications, Line 2, delete "Head-Mounted-Display" and insert -- Head-Mounted Display --, therefor.

In Column 2, item (56), other publications, Line 5, delete "Head-Mounted-Display" and insert -- Head-Mounted Display --, therefor.

In Column 2, item (56), other publications, Line 8, delete "Head-Mounted-Display" and insert -- Head-Mounted Display --, therefor.

In Column 2, item (57), Abstract, Line 1, delete "head-mounted-display" and insert -- head-mounted display --, therefor.

In the Specification

In Column 1, Line 2, Title, delete "HEAD-MOUNTED-DISPLAY" and insert -- HEAD-MOUNTED DISPLAY --, therefor.

In the Claims

In Column 12, Line 43, Claim 1, delete "head-mounted-display" and insert -- head-mounted display --, therefor.

In Column 12, Line 63, Claim 2, delete "head-mounted-display" and insert -- head-mounted display --, therefor.

Signed and Sealed this
First Day of October, 2019

Andrei Iancu
*Director of the United States Patent and Trademark Office*

CERTIFICATE OF CORRECTION (continued)
U.S. Pat. No. 10,379,366 B1

In Column 13, Line 7, Claim 3, delete "head-mounted-display" and insert -- head-mounted display --, therefor.

In Column 13, Line 13, Claim 4, delete "head-mounted-display" and insert -- head-mounted display --, therefor.

In Column 13, Line 18, Claim 5, delete "head-mounted-display" and insert -- head-mounted display --, therefor.

In Column 13, Line 22, Claim 6, delete "head-mounted-display" and insert -- head-mounted display --, therefor.

In Column 13, Line 29 (approx.), Claim 7, delete "head-mounted-display" and insert -- head-mounted display --, therefor.

In Column 13, Line 41, Claim 9, delete "head-mounted-display" and insert -- head-mounted display --, therefor.

In Column 13, Line 51, Claim 10, delete "head-mounted-display" and insert -- head-mounted display --, therefor.

In Column 13, Line 53, Claim 11, delete "head-mounted-display" and insert -- head-mounted display --, therefor.

In Column 14, Line 7, Claim 12, delete "head-mounted-display" and insert -- head-mounted display --, therefor.

In Column 14, Line 12, Claim 13, delete "head-mounted-display" and insert -- head-mounted display --, therefor.

In Column 14, Line 24, Claim 15, delete "head-mounted-display" and insert -- head-mounted display --, therefor.

In Column 14, Line 35, Claim 16, delete "head-mounted-display" and insert -- head-mounted display --, therefor.

In Column 14, Line 41, Claim 17, delete "head-mounted-display" and insert -- head-mounted display --, therefor.